(12) United States Patent
Rodriguez Tsouroukdissian

(10) Patent No.: US 10,400,754 B2
(45) Date of Patent: Sep. 3, 2019

(54) DAMPING DEVICE FOR ONSHORE AND OFFSHORE WIND TURBINES

(71) Applicant: General Electric Company, Schenectady, NY (US)

(72) Inventor: Arturo Rodriguez Tsouroukdissian, Richmond, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/672,411

(22) Filed: Aug. 9, 2017

(65) Prior Publication Data

US 2019/0048855 A1    Feb. 14, 2019

(51) Int. Cl.
| | | |
|---|---|---|
| F16F 15/02 | (2006.01) | |
| F03D 13/20 | (2016.01) | |
| E04B 1/98 | (2006.01) | |
| F16F 15/023 | (2006.01) | |

(52) U.S. Cl.
CPC .............. F03D 13/20 (2016.05); E04B 1/985 (2013.01); F03D 13/22 (2016.05); F16F 15/02 (2013.01); *F05B 2220/706* (2013.01); *F05B 2240/2211* (2013.01); *F05B 2240/912* (2013.01); *F05B 2240/95* (2013.01); *F05B 2260/964* (2013.01); *F16F 15/023* (2013.01)

(58) Field of Classification Search
CPC ............... F03D 7/0296; F05B 2260/96; F05B 2240/912; F05B 2260/964; F16F 15/02
See application file for complete search history.

(56) References Cited

U.S. PATENT DOCUMENTS

| | | | | | |
|---|---|---|---|---|---|
| 2,053,226 | A | * | 9/1936 | Ruge .......................... | E04H 9/02 52/113 |
| 3,418,768 | A | * | 12/1968 | Cardan ...................... | E04H 9/02 188/312 |
| 6,672,837 | B1 | * | 1/2004 | Veldkamp ................. | F16F 7/10 416/144 |
| 7,931,438 | B2 | * | 4/2011 | Schellings ................ | F03D 1/00 416/1 |
| 7,980,814 | B2 | * | 7/2011 | Nieuwenhuizen .... | E04H 12/085 415/119 |

(Continued)

FOREIGN PATENT DOCUMENTS

| | | |
|---|---|---|
| EP | 2 696 072 A1 | 2/2014 |
| EP | 2 708 742 A1 | 3/2014 |
| EP | 2 867 114 A1 | 5/2015 |

OTHER PUBLICATIONS

Extended European Search report and Opinion issued in connection with corresponding EP Application No. 18176311.1 dated Jan. 4, 2019.

*Primary Examiner* — Brian E Glessner
*Assistant Examiner* — Daniel J Kenny
(74) *Attorney, Agent, or Firm* — Dority & Manning, P.A.

(57) ABSTRACT

A damping device for a wind turbine tower is disclosed having at least one upper mount extending from a tower structure, at least one lower mount extending from one of the tower structure or a tower foundation, at least one damping device extending only in a substantially vertical direction, the damping device having an upper connector coupled with the upper mount and a lower connector coupled with the lower mount, and at least one damper coupled between the upper connector and the lower connector.

6 Claims, 7 Drawing Sheets

(56) References Cited

U.S. PATENT DOCUMENTS

| | | | |
|---|---|---|---|
| 8,641,369 B2 | 2/2014 | Rodriguez Tsouroukdissian | |
| 8,943,763 B2 | 2/2015 | Lim | |
| 9,163,424 B2 | 10/2015 | Montgomery et al. | |
| 9,494,207 B2 | 11/2016 | Okimura et al. | |
| 9,567,763 B2 * | 2/2017 | Miyazawa | E04H 9/021 |
| 9,644,384 B2 * | 5/2017 | Powell | E04H 9/021 |
| 9,909,335 B2 * | 3/2018 | Powell | E04H 9/021 |
| 2007/0114799 A1 * | 5/2007 | Riesberg | F03D 7/0296 |
| | | | 290/55 |
| 2010/0314883 A1 * | 12/2010 | Ollgaard | F03D 80/00 |
| | | | 290/55 |

* cited by examiner

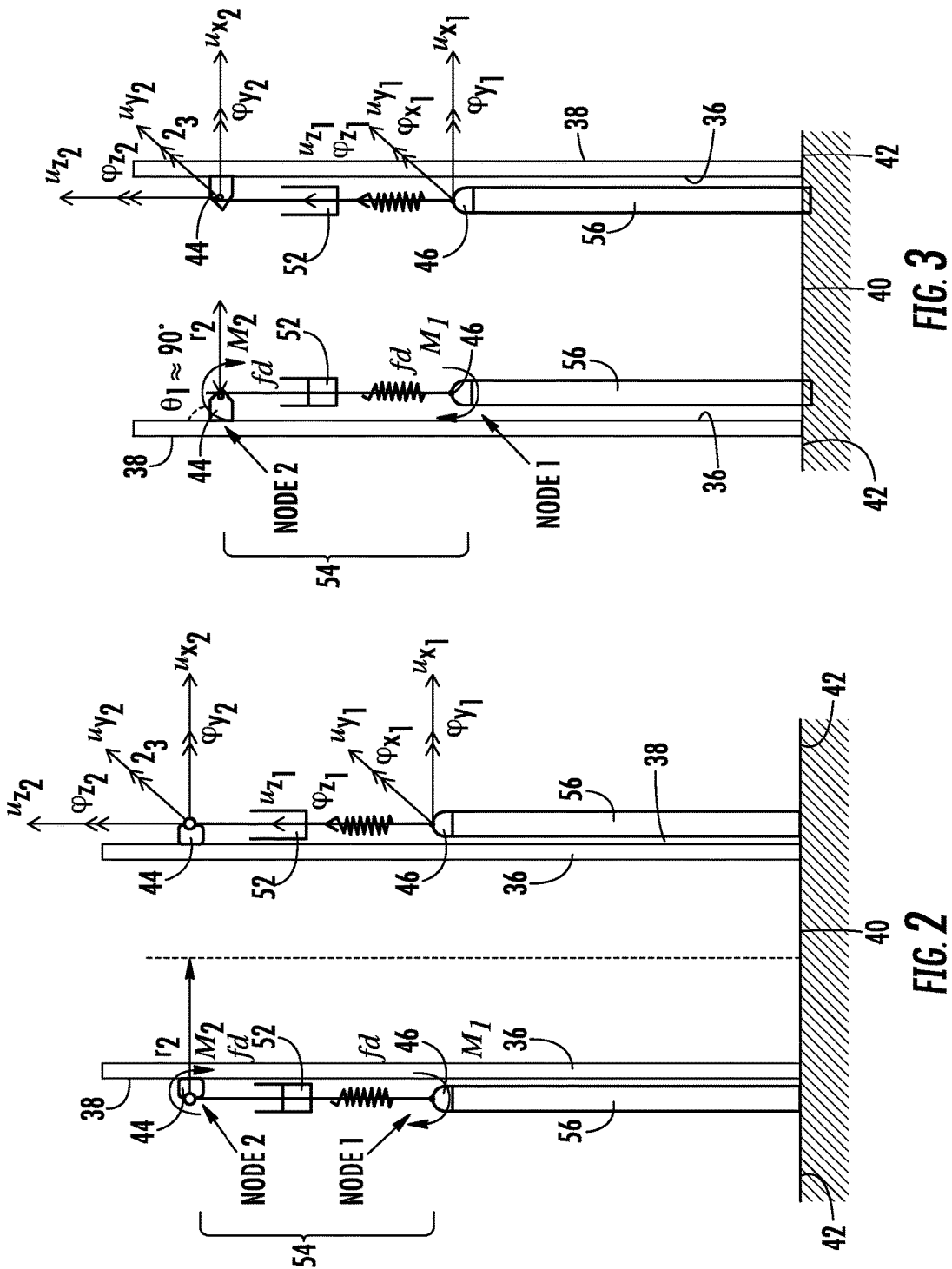

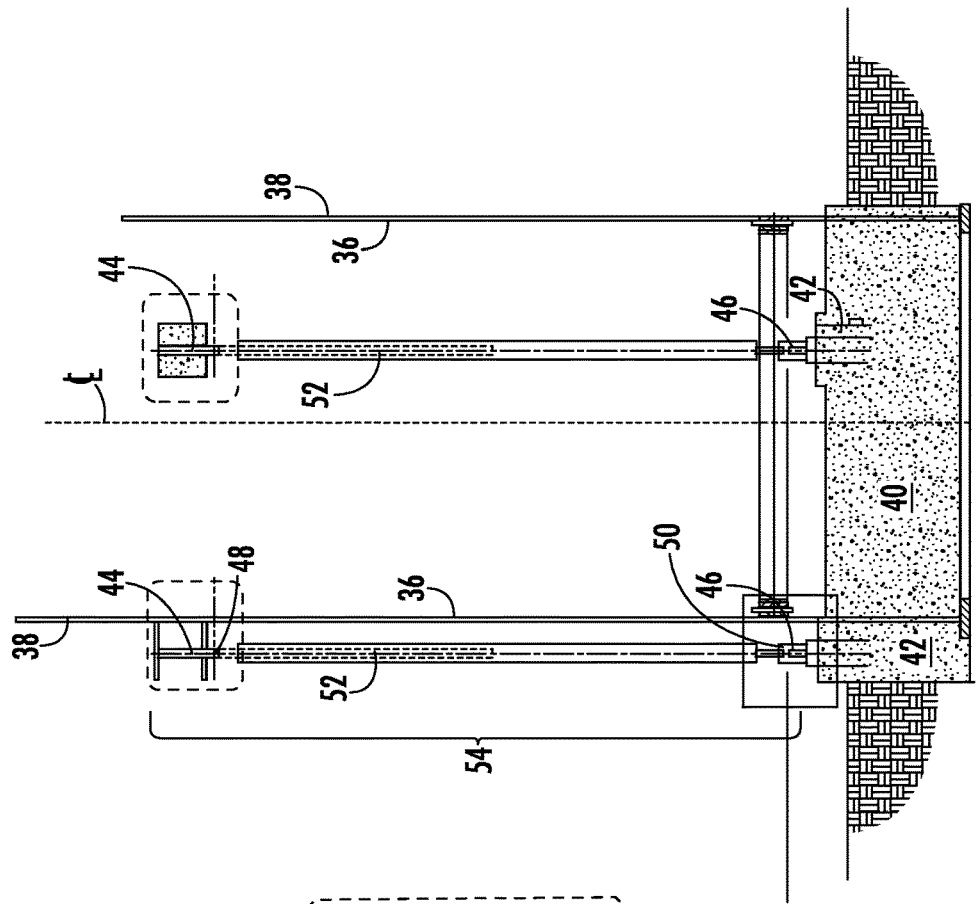
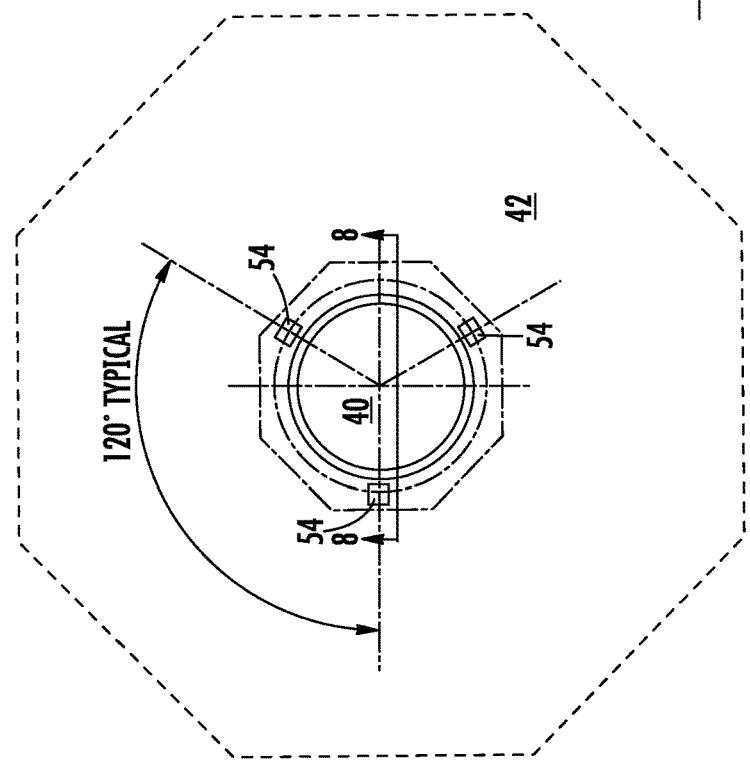

DAMPING DEVICE FOR ONSHORE AND OFFSHORE WIND TURBINES

STATEMENT REGARDING FEDERALLY SPONSORED RESEARCH

This invention was made with Government support under contract number DE-EE0005494 awarded by the Department Of Energy. The Government has certain rights in this invention.

FIELD OF THE INVENTION

The present subject matter relates generally to wind turbines and, more particularly to a method and system for damping vibrations in a wind turbine.

BACKGROUND OF THE INVENTION

Undesired vibrations may occur in a wind turbine tower structure. Vibrations can include any kind of oscillatory or repeating displacements in any direction (transverse, longitudinal or torsional) of any amplitude (large or small) and of any frequency (high or low, constant or varying). These vibrations may be caused by different factors, e.g. wind acting on the tower, blades passing along the tower and locally disturbing the wind flow, vibrations transmitted from the gearbox to the tower, rotor movements, nacelle imbalances, vibrations from the hub transmitted to the tower etc. If a tower is subjected to this kind of vibrations during a prolonged period of time, fatigue damage may result. Fatigue damage may lead to a reduced life time of the wind turbine tower and/or its components. Furthermore, the danger exists that when vibrations cause resonance in the wind turbine tower, this can lead to a potentially dangerous increase of the vibrations. As towers become larger and more slender, they also become more sensitive to induced vibrations. Increasing the thickness of the wind turbine tower can overcome these vibrations however, this increase of material in the tower increases the cost of the wind turbine and further complicate the transport of the tower to location.

Wind turbines are being sited offshore, near-shore and onshore. Whether the wind turbine tower is floatingly or fixed-bottom arranged (offshore), arranged on a foundation in the sea bed (near-shore), or placed on a soil foundation (onshore), the waves of the sea and violent winds may form another source of vibrations in the wind turbine tower. Additionally, the design tip speed ratio of wind turbines placed offshore or near-shore is generally higher than for wind turbines placed on shore. The hub will thus rotate at higher speeds. The frequency with which blades pass past the tower thus also increases. The danger of vibrations reaching a resonant frequency of the wind turbine tower increases therewith

BRIEF DESCRIPTION OF THE INVENTION

Aspects and advantages of the invention will be set forth in part in the following description, or may be obvious from the description, or may be learned through practice of the invention.

In one aspect, a damping device for a wind turbine tower is disclosed having at least one upper mount extending from a tower structure, at least one lower mount extending from one of the tower structure or a tower foundation, at least one damping device extending only in a substantially vertical direction, the damping device having an upper connector coupled with the upper mount and a lower connector coupled with the lower mount, and at least one damper coupled between the upper connector and the lower connector.

In another aspect, the present subject matter discloses a wind turbine having a substantially tubular tower structure extending from a nacelle to a tower foundation, the tower structure having a plurality of substantially tubular segments having an exterior wall and an interior wall, the tower foundation having an exterior portion and an interior portion. The nacelle is mounted atop the tower structure and a rotor is coupled to the nacelle, the rotor having one or more rotor blades attached thereto. At least one upper mount extends from the tower structure and at least one lower mount extends from one of the tower structure or the tower foundation. At least one damping device extends only in a substantially vertical direction, the damping device having an upper connector coupled with the upper mount, a lower connector coupled with the lower mount, and at least one damping device having at least one damper coupled between the upper connector and the lower connector.

In a further aspect, the present subject matter discloses a method for damping vibrations in a wind turbine, the method steps having; installing at least one upper mount to extend from one of an interior wall or exterior wall of a tower structure, and installing at least one lower mount to extend from one of an interior portion or exterior portion of a tower foundation, respectively; then coupling at least one damping device to extend only in a substantially vertical direction, the damping device having an upper connector coupled with the at least one upper mount, a lower connector coupled with the at least one lower mount, and at least one damper coupled between the upper connector and the lower connector; then initiating the damping device to provide a resultant force in the opposite direction from vibration mode movement in the upper mount or lower mount.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 2 illustrates an "onshore exterior" embodiment of the subject matter disclosed herein;

FIG. 3 illustrates an "onshore interior" embodiment of the subject matter disclosed herein;

FIGS. 7 and 8 illustrate plan and section views of a typical "onshore exterior" installation;

Figure 1:
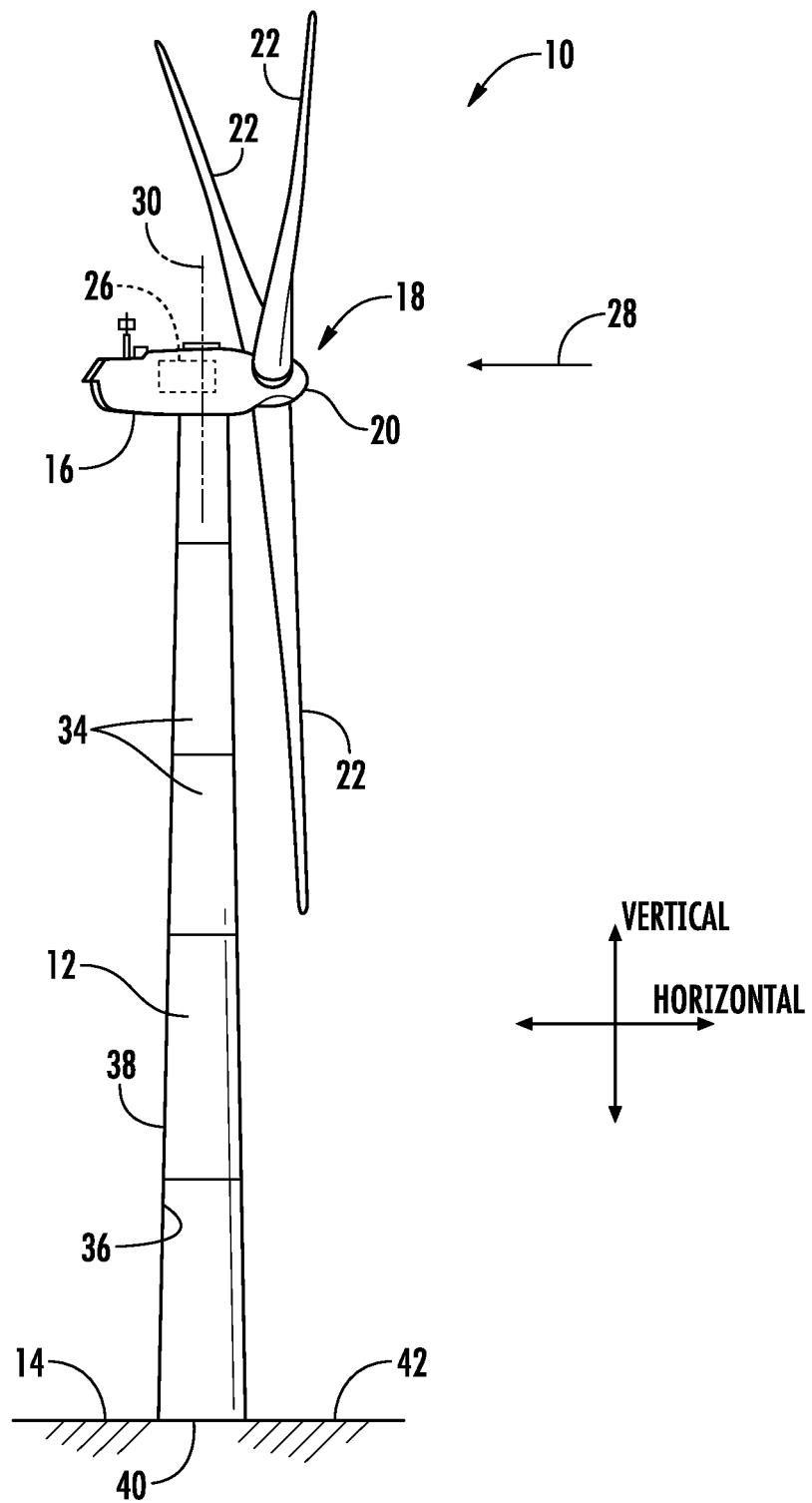
FIG. 1 illustrates a side view of one embodiment of a wind turbine of conventional construction.

Repeat use of reference characters in the present specification and drawings is intended to represent the same or analogous features or elements of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter discloses systems and methods for damping vibrations in wind tower structures. Due to tight clearances, mass and weight constraints, and other operational limitations, damping devices must be integrated with the tower structure, in both onshore and offshore locations, to enable efficient and effective assembly and maintenance of the wind turbines.

The dampers used in the damping systems disclosed herein may be varied within the scope of the present invention. In one aspect, they may be viscous fluid dampers. Any kind of damper (e.g. hydraulic, pneumatic, solid friction, rotational inertia-viscous dampers, rotational friction dampers etc.) may be used within the scope of the present invention. The dampers may be passive, semi-active, active or hybrid.

A passive damper system will have a non-variable damping coefficient. In a semi-active damper system, the damping coefficient may be varied with a control system. In an active damper system, the damper is actively steered, e.g. by increasing or decreasing pressure in one of the fluid chambers. A semi-active damper system may be formed e.g. by a variable-orifice viscous damper, a variable stiffness damper, a variable-friction damper or a controllable fluid damper. A hybrid damper combines a passive damper in series with an active damper. A controllable fluid damper can be a magnetorheological fluid damper or electorheological fluid damper. In magnetorheologial fluid dampers, the damper fluid contains metallic particles. The damper's damping coefficient can be controlled by an electro-magnet. A control system may thus send control signals to an electro-magnet which can increase or decrease the damping coefficient. Electrorheological fluids are suspensions of fine non-conducting particles in an electrically insulating fluid. The viscosity of these fluids may be changed reversibly and very quickly in response to an electric field. In such a damper, the friction coefficient can thus be varied by applying an electric field. Additionally, reference herein is made to a substantially tubular tower structure shown to have a cylindrical cross-section. It should be understood, that within the scope of the present invention, the substantially tubular structure may also have an elliptical or substantially elliptical cross-section along at least a part of the height of the wind turbine tower, space frame construction on at least a portion of the tower, and/or concrete construction on at least a portion of the tower. Additionally, various components are described to be hingedly arranged with respect to another component. This is to be interpreted as any joint that holds two parts together, but allows one of the components to rotate relative to the other about the hinge. A hinge in this sense may thus refer e.g. to a spherical bearing arrangement or a simple pivoting hinge.

Referring now to the drawings, FIG. 1 illustrates a perspective view of one embodiment of a wind turbine 10 of conventional construction. A directional legend establishes the vertical and horizontal directions used herein. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

FIG. 2 illustrates a first "onshore exterior" embodiment of the damping device 54 wherein the upper mount(s) 44 extend from an exterior wall 38 of the tower 12 and the lower mount(s) 46 extend from an exterior portion 42 of the tower foundation. The damper 52 is a portion of the damping device 54 that extends only in a substantially vertical direction thereby providing a compact linear arrangement for the damping device 54. FIG. 3 illustrates an "onshore interior" embodiment of the damping device 54 that provides better weather protection and wherein the upper mount (s) 44 extend from an interior wall 36 of the tower 12 and the lower mount(s) 46 extend from an interior portion 40 of the tower foundation. Again, the damper 52 is a portion of the damping device 54 that extends only in a substantially vertical direction thereby providing a compact linear arrangement for the damping device 54. The lower mounts 46 is these embodiments can have a mount extension 56 to locate Node 1 of the damping device closer to the damper 52 for mechanical advantage.

Figure 4:
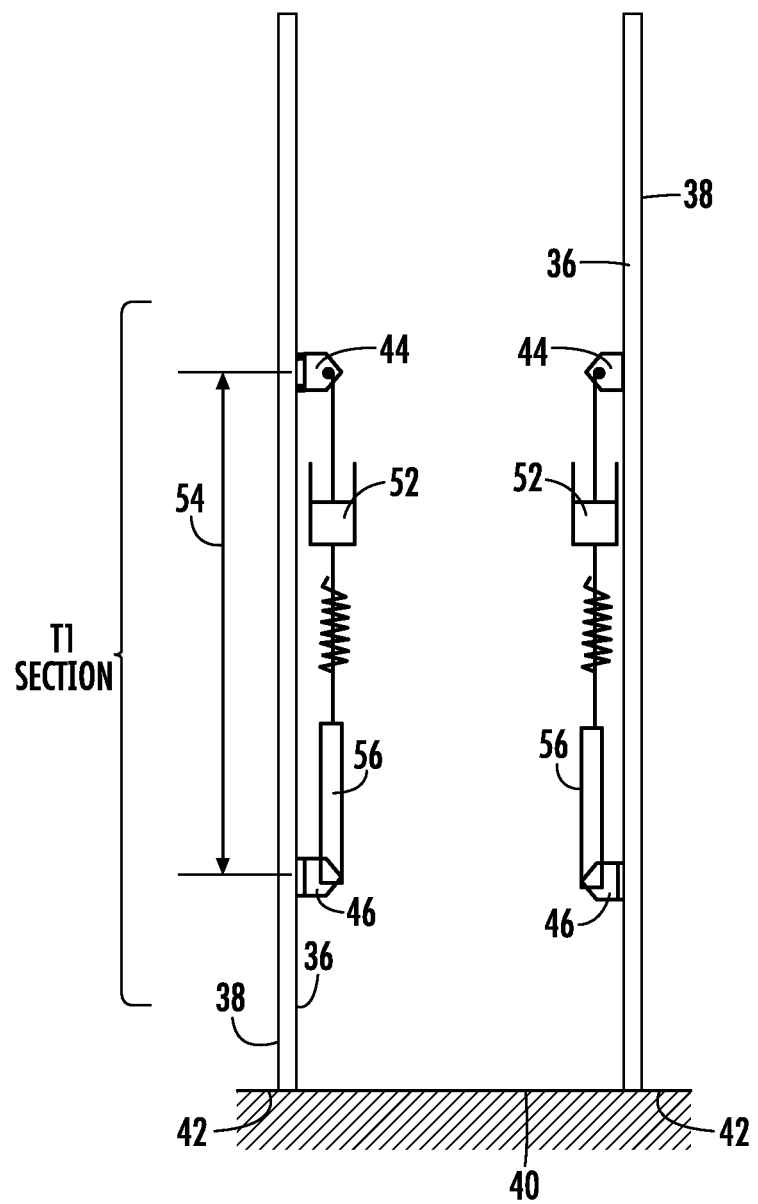
FIG. 4 illustrates an "uptower interior" embodiment of the subject matter disclosed herein.

FIG. 4 illustrates an "up-tower interior" embodiment of the damping device used for damping vibrations between adjacent tower segments 34 (see FIG. 1). This embodiment can also be used within the same tower segment to dampen intersegment vibrations arising from rotor blade passage or other sources.

Figure 6:
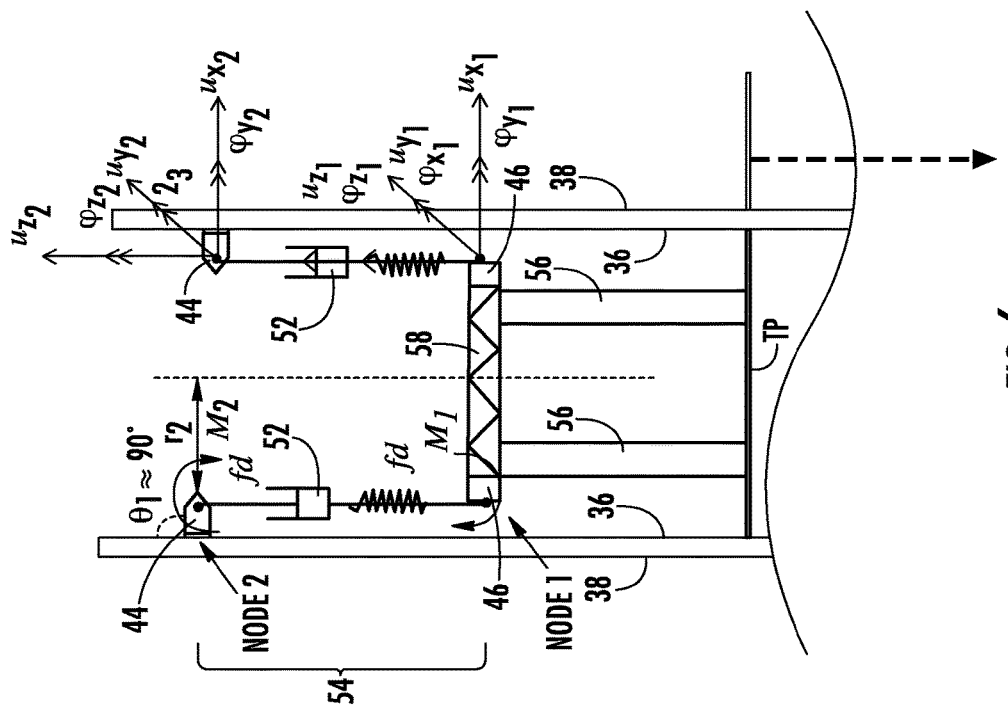
FIGS. 5 and 6 illustrate "offshore interior" embodiments of the subject matter disclosed herein.
Figure 5:
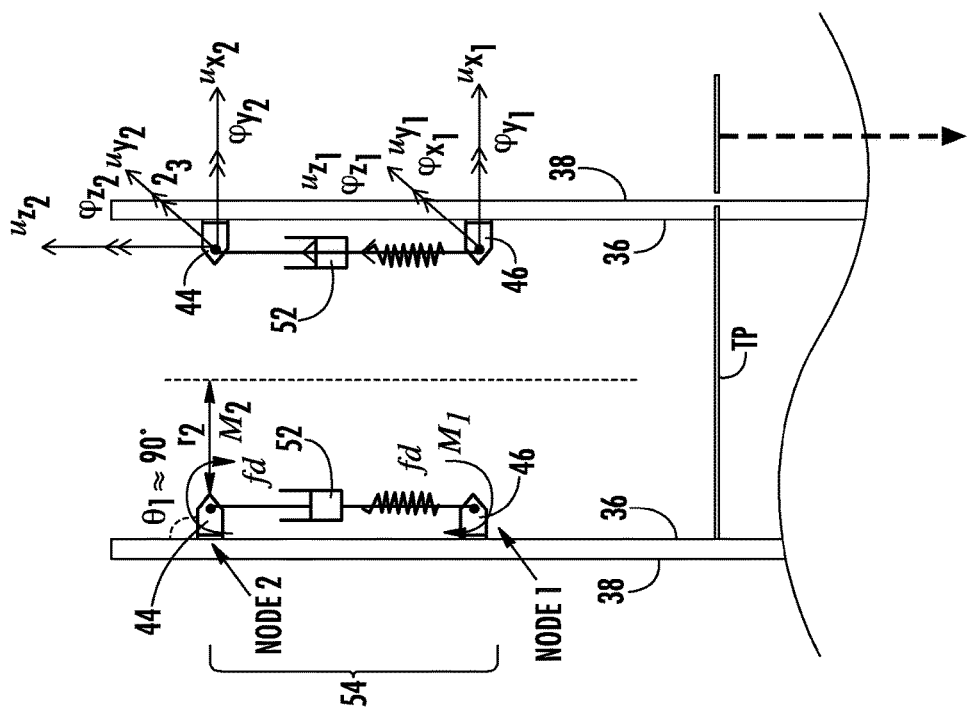

FIG. 5 illustrates an "offshore interior" embodiment of the damping device 54 located in the bottom segment of the tower wherein the bottom mount 46 couples with the interior wall 36 of the tower that connects to a transition piece (TP) from the monopile typically consisting of a hollow steel pile driven into the seabed. In this embodiment, a tower portion near the TP is used for transmitting forces from the damping device 54 to the TP. Because the verticality of the monopile cannot be guaranteed, a transition piece (TP) is typically placed over the steel pile that provides a leveling mechanism for the turbine and its tower. The offshore foundation can also include a floating and/or semi-submersible portion, for example a jacket/tripod portion, a spar-buoy portion, a wind-float with drag anchors portion, a tension leg platform portion, and combinations thereof. FIG. 6 illustrates another "offshore interior" embodiment wherein the lower mount extensions 56 couple with lower mount horizontal bracing 58 for direct connection to the TP and to add flexibility for locating the mount extensions 56. In this FIG. 6 embodiment, the lower mount 46 directly couples with the TP thereby avoiding vibration passage through a tower section.

Figure 10:
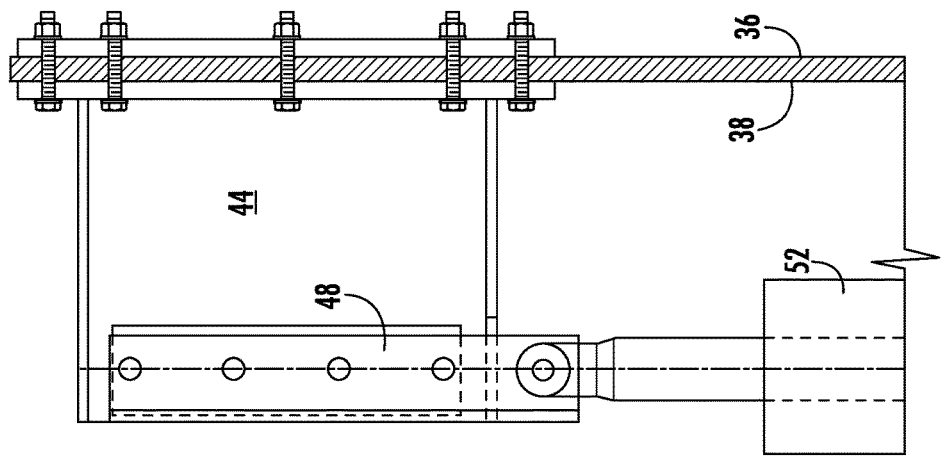
FIGS. 9 and 10 illustrate details of the upper and lower connections for the installation shown in FIGS. 7 and 8.
Figure 9:
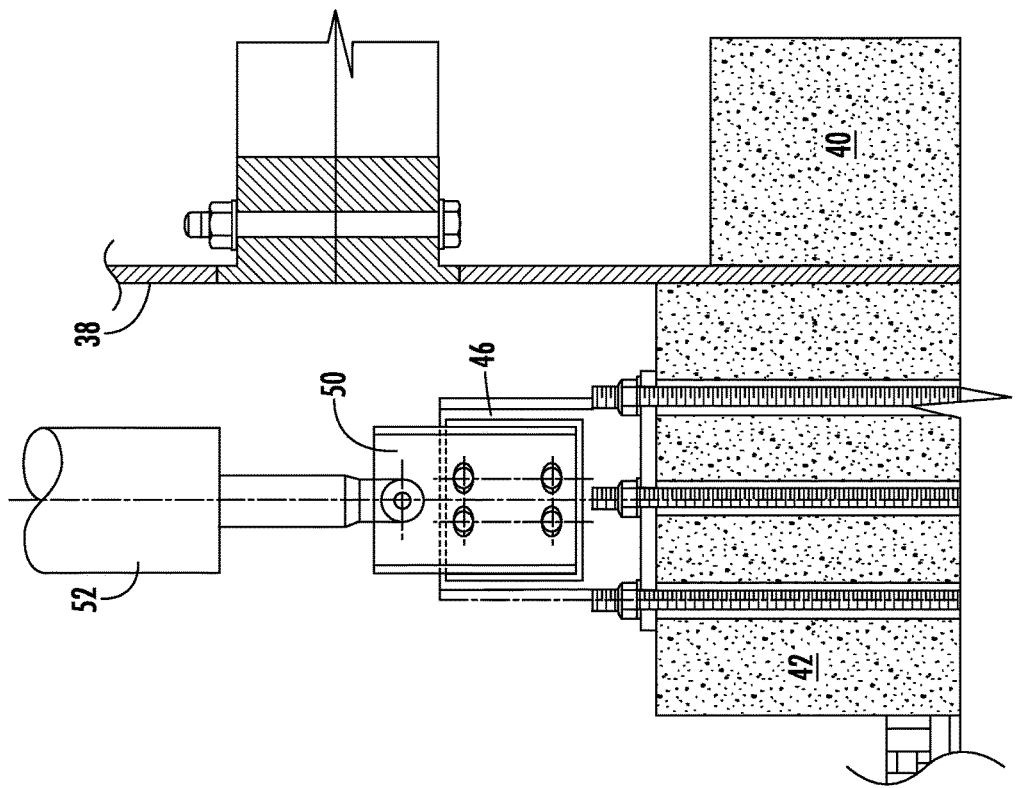

FIGS. 7 and 8 illustrate plan and section views of a typical "onshore exterior" installation of the damping device 54. This embodiment positions three equidistant damping devices 54, set at 120 degree angles apart around the perimeter of a tower to dampen tower vibrations. The lower mounts 46 are embedded in raised exterior portions 42 of the tower foundation. Upper connectors 48 and lower connectors 50 can be hinged to the upper and lower mounts 44, 46. The damping device 54 can include a structural column, or other structural extension similar to the mount extension 56 (see FIG. 6), to extend from the upper or lower connector 48, 50 to the upper or lower mounts 44, 46. The structural extension can also include a cylindrical portion that encloses the damper 52 for weather protection. This can minimize the overall length of the damper 52 itself while extending the connection points for the damping device 54. FIGS. 9 and 10 illustrate more detail of the upper and lower connections for the damping device 54 in FIGS. 7 and 8.

Figure 11:
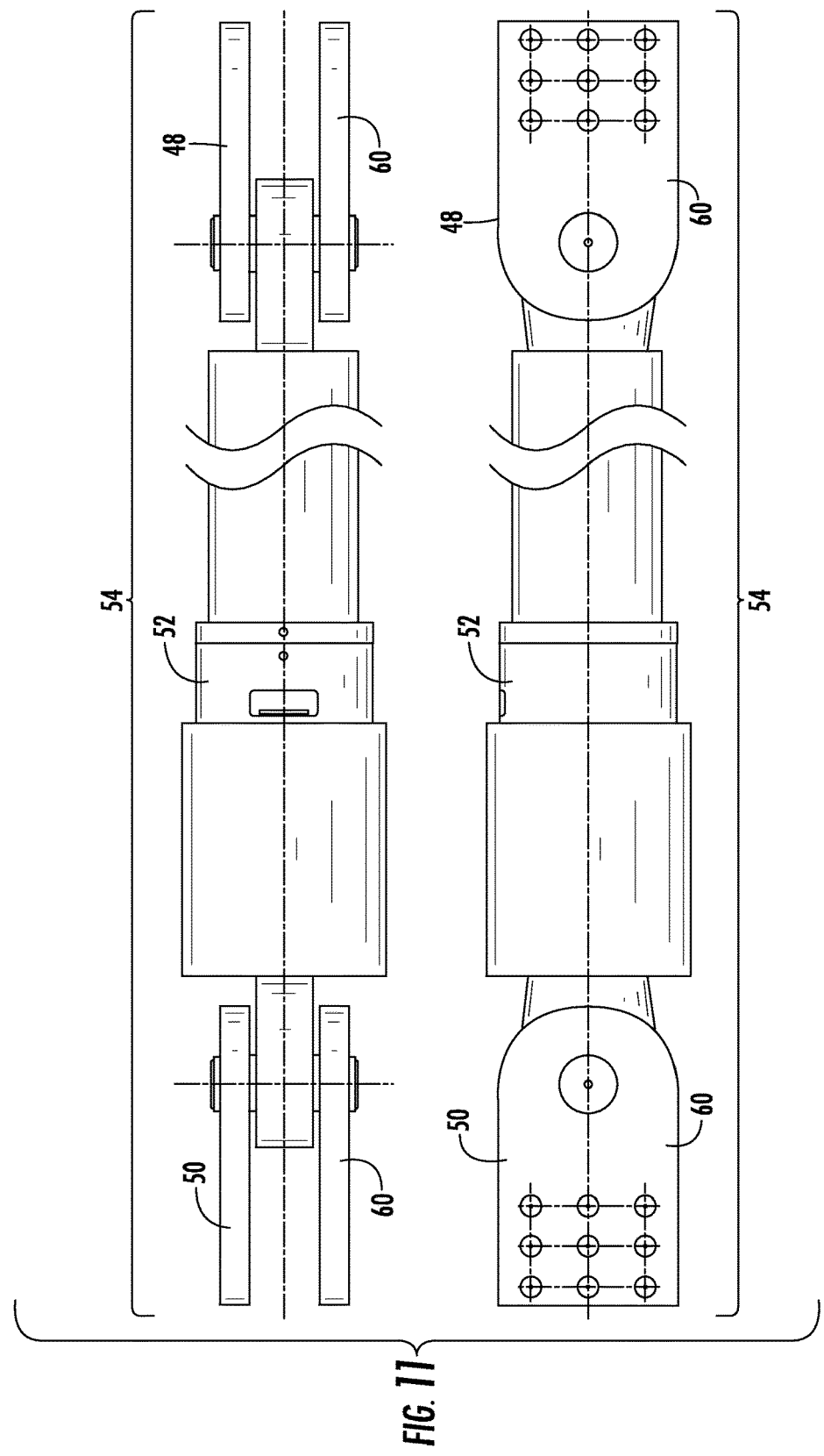
FIG. 11 illustrates and embodiment of the damping device.

FIG. 11 illustrates and embodiment of the damping device 54 having a damper 52, an upper connector 48, and a lower connector 50. Both upper and lower connectors 48, 50 are connected to the damper 52 using a hinged connection. The hinge can include a clevis section 60 pinned to each respective damper shaft. The damper 52 can have a damping coefficient in the range of 5 to 5000 meganewton-seconds/meter and all subranges between. One embodiment of the damper 52 can have a damping coefficient in the range of 50 to 70 meganewton-seconds/meter.

An embodiment of a wind turbine 10, as shown in the figures, can include a substantially tubular tower structure 12 extending from a nacelle 16 to a tower foundation, the tower structure 12 having a plurality of substantially tubular segments 34 having an exterior wall 38 and an interior wall 36, the tower foundation having an exterior portion 42 and an interior portion 40. The nacelle 16 can be mounted atop the tower structure 12 and a rotor 18 can be coupled to the nacelle 16, with the rotor 18 having one or more rotor blades 22 attached thereto. At least one upper mount 44 can extend from the tower structure 12 and at least one lower mount 46 can extend from one of the tower structure 12 or the tower foundation. At least one damping device 54 extends only in a substantially vertical direction between an upper connector 48 coupled with the upper mount 44 and a lower connector 50 coupled with the lower mount 46. The at least one damping device 54 can have at least one damper 52 coupled between the upper connector 48 and the lower connector 50. The at least one damper 52 can be a viscous damper further having at least one of a passive damper, a semi-active damper, an active damper, a hydraulic damper, a pneumatic damper, a solid friction damper, a rotational inertia-viscous damper, a rotational friction damper, a variable-orifice viscous damper, a variable stiffness damper, a variable-friction damper, a controllable fluid damper and combinations thereof. The upper connector 48 and lower connector 50 can have hinges.

The lower mount(s) 46 can extend from at least one of space trusses, beams, tower base flanges, transition pieces, tower foundation extensions, and combinations thereof. The tower foundation 40, 42 can be positioned at one of onshore, near-shore, and offshore.

A method for damping vibrations in a wind turbine 10 can include the steps of; installing at least one upper mount 44 to extend from one of an interior wall 36 or exterior wall 38 of a tower structure 12, and installing at least one lower mount 46 to extend from one of an interior portion 40 or exterior portion 42 of a tower foundation, respectively. Then coupling at least one damping device 54 to extend only in a substantially vertical direction, the damping device 54 having an upper connector 48 coupled with the at least one upper mount 44, a lower connector 50 coupled with the at least one lower mount 46, and at least one damper 52 coupled between the upper connector 48 and the lower connector 50. Then initiating the damping device 54 to provide a resultant force in the opposite direction from vibration mode movement in the upper mount 44 or lower mount 46.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A wind turbine, comprising;
a substantially tubular tower structure extending from a tower foundation, the tower structure comprising a plurality of substantially tubular segments having an exterior wall and an interior wall, the tower foundation comprising an exterior portion and an interior portion;
a nacelle mounted atop the tower structure;
a rotor coupled to the nacelle, the rotor having one or more rotor Hades attached thereto;
at least one upper mount extending from the tower structure;
at least one lower mount extending from one of the tower structure or the tower foundation;
at least one damping device extending parallel with the interior wall of the tubular sections, the damping device comprising an upper connector coupled with the upper mount, a lower connector coupled with the lower mount, and at least one damper coupled between the upper connector and the lower connector.

2. The wind turbine of claim 1, wherein the upper mount and lower mount extend from the tower structure interior wall.

3. The wind turbine of claim 1, wherein the upper connector and lower connector comprise hinges.

4. The wind turbine of claim 1, wherein the tower foundation is configured to be positioned at one of onshore, near-shore, and offshore.

5. The wind turbine of claim 1, wherein the at least one damper comprises a viscous damper further comprising at least one of a passive damper, a semi-active damper, an active damper, a hybrid damper, a hydraulic damper, a pneumatic damper, a solid friction damper, a rotational inertia-viscous damper, a rotational friction damper, a variable-orifice viscous damper, a variable stiffness damper, a variable-friction damper, a controllable fluid damper and mixtures thereof.

6. The wind turbine of claim 1, wherein the at least one damper comprises a damping coefficient in the range of 5 to 5000 meganewton-seconds/meter.

* * * * *